United States Patent [19]

Orwin

[15] 3,703,817
[45] Nov. 28, 1972

[54] FLEXIBLE COUPLINGS
[72] Inventor: Olaf John Barclay Orwin, Birmingham, England
[73] Assignee: GIB Precision Limited, Gloucester, England
[22] Filed: Aug. 26, 1971
[21] Appl. No.: 175,297

[30] Foreign Application Priority Data
Aug. 26, 1970 Great Britain..........40,953/70

[52] U.S. Cl. .................................64/13, 64/27 NM
[51] Int. Cl..............................................F16d 8/00
[58] Field of Search.............64/13, 12, 27 NM, 27 R

[56] References Cited
UNITED STATES PATENTS
1,947,052    2/1934    Lack............................64/13

Primary Examiner—Benjamin W. Wyche
Assistant Examiner—Randall Heald
Attorney—A. Yates Dowell et al.

[57] ABSTRACT

Flexible coupling, comprising a flexible torque transmitting member connected to a pair of rotatable coaxial drive members by bolts extending axially through peripherally coned bushes seating in correspondingly coned holes in the drive members.

5 Claims, 3 Drawing Figures

PATENTED NOV 28 1972 3,703,817

Inventor
Olaf John Barclay Orwin

Attorneys

FLEXIBLE COUPLINGS

BACKGROUND OF THE INVENTION

1. Field of the invention

This invention relates to torque transmitting flexible couplings of the kind, herein called the kind specified, comprising a pair of rotatable metal drive members in spaced apart coaxial relationship, with a flexible torque transmitting member disposed therebetween and drivingly connected to each of the drive members by screw threaded bolts each extending through the flexible member and one or the other of the two drive members, the latter being provided with bolt receiving metal bushes through which the bolts extend in a direction parallel to the axis of rotation of the associated drive member, the arrangement being such that as a result of any misalignment of the axes of rotation of the two drive members, the flexible member at positions between the axially extending bolts is free to flex in a direction towards either drive member.

2. Description of the Prior Art.

Usually in couplings of the kind specified, the flexible member is of annular form, with the bolts spaced circumferentially around the annular member, with circumferentially adjacent bolts extending in opposite axial directions from the annular member to one or the other of the two drive members.

The invention is particularly applicable to constructions in which the annular flexible member is of laminated construction formed of a number of juxtaposed overlying annular flexible metal strips disposed with the major axes of cross section lying in planes substantially radial to the axis of rotation.

Whatever particular arrangement is adopted, in flexible couplings of the kind specified, the bolt receiving metal bushes in the two drive members are a very desirable requirement. This is because the axial length of each bolt between the flexible member and the opposed face of the drive member into which the bolt extends must be large enough to provide for the above mentioned flexing of the flexible member towards either drive member. This is especially so where the flexibility of the member is increased by forming it as a laminate as above described. As a result the above mentioned axial length of each bolt is such that the bolts at positions where they extend into their associated drive members are subjected to very high bending moments and it is accordingly very desirable to reinforce the bolts against bending at such positions by the bushes.

Such reinforcement of the bolts against bending cannot satisfactorily be taken care of in our opinion by omitting the bushes and increasing the diameter of the bolts sufficiently to provide therein at such position the required resistance to bending because:

a. Too large a bolt diameter so increases the bore of the bolt holes in the flexible member as undesirably to reduce its strength and if the member is an annular member, the radial thickness thereof must be correspondingly increased to avoid undue weakening of the member at the bolt holes.

b. Because of the high torque which these couplings are usually required to transmit, bolts must be formed in a high tensile metal, usually a high tensile steel, so that to provide an increase in bolt diameter large enough to compensate for the absence of the bushes adds significantly to the overall cost of each coupling.

Hitherto, the bolt receiving bushes in the drive members have as far as we are aware been of shouldered configuration and of cylindrical form peripherally, with the smaller diameter cylindrical portion received within a circular hole of the same diameter throughout its length and formed in the drive members, with the shoulder abutting the drive member face which is nearest to the flexible member.

Although the above form of bolt receiving bush has been customary for several years, it entails the following disadvantages:

1. Both the smaller diameter portion of each bush and each drive member hole should be accurately and thus expensively formed to close tolerances so that each hole conforms closely throughout its length to the peripheral diameter of the smaller diameter portion of the bush. However such accurate forming operations are not commercially acceptable in the manufacture of couplings of the kind specified. In consequence, in practice the tolerance clearance between the hole and the bush therewithin is liable to be so much greater than that which is desired that not only is the bush liable undesirably to rock within the hole under the torque loading, but the stress loading between the bush and the drive member is liable to be unduly localized so as to be confined to the part of the drive member hole nearest to the flexible member. As a result, not only may the bore of the hole at such location be undesirably enlarged by the localized stress loading but fretting fatigue or fretting corrosion as it is often termed is liable to develop in the metal at such locations during service. Also, the stress loading in the bolt itself may be correspondingly localized so that overstressing of the bolts is liable to occur especially after the coupling has been in service.

2. The undesirably large clearance which may exist as mentioned in the preceding paragraph cannot be taken up by tightening of the bolts however great the tightening pressure which is applied may be.

3. However accurately the cylindrical bushes and drive member holes are formed by commercially acceptable methods, our experience indicates that overstressing of the bolts still occurs, particularly after the coupling has been in service for only a minor part of its designed useful life and further that the bolts and/or the bushes are still liable to rock with resulting wear in use.

4. However accurately the bushes and holes are formed by techniques which are commercially acceptable in the manufacture of couplings of the kind specified, our experience indicates that because the bushes are required to be as close a fit as possible in their respective holes, it is necessary for the bushes specially to be fitted in the holes by a skilled operation prior to and separate from the final assembly of the entire coupling, so that the overall assembly cost of each coupling is undesirably large.

The present invention has for its object the provision of an improved construction of coupling of the kind specified by which the foregoing disadvantages of the existing form of coupling above described are avoided.

SUMMARY OF THE INVENTION

According to this invention each of the bush receiving holes in the two drive members is of frusto-conical as opposed to cylindrical form, so as to be of progressively reduced diameter in an axial direction inwardly from the face of the drive member nearest to the flexible member, and each of the bushes comprises a frusto-conical portion which extends within the corresponding hole in which it is secured by the associated bolt when the latter is tightened, the cone angle of each frusto-conical portion being not less than the cone angle of the corresponding hole and such that when the bolt is tightened, at least the larger diameter portion of the hole, nearest to the flexible member, is in close engagement with the frusto-conical periphery of the bush therewithin.

Preferably the two cone angles are identical, so as to maintain a close engagement between the bush and the hole over the entire periphery of the bush therewithin, it being essential that the cone angle of the bush be not less than that of the hole in order to maintain close engagement at the larger diameter portion of the hole as above described so as to avoid rocking of the bush within the hole.

The present invention is believed to provide the following advantages over the existing construction above described:

1. Unlike a cylindrical hole, a frusto-conical hole can be formed inexpensively and thus by commercially acceptable methods so as to have close engagement over its entire axial length with the frusto-conical portion of the bush, namely by forming the hole with a tool having the same cone angle as that of the frusto-conical portion of the bush, without the accurate machining and fitting operations required in close fitting a cylindrical portion of a bush within a cylindrical shape hole of the same nominal diameter. This is because the effect of tightening the bolt is necessarily to force the bush into progressively tighter engagement with the wall of the hole.

2. Because the bushes can readily be brought into right engagement with the holes by tightening of the bolts, rocking of each bush within the hole and an undesirably localized stress in the bolt and in the drive member at the end of the hole nearest to the flexible member is inexpensively avoided, with consequent freedom from fretting fatigue and fretting corrosion.

3. Assembly of the coupling is greatly facilitated in that as the bushes are not required to be carefully fitted in the holes, the bushes can be assembled therein as part of the assembly of the entire coupling so that a substantial saving in assembly time and cost is effected.

4. Although it is preferred that the frusto-conical portion of each bush which is within the corresponding hole should over its entire periphery be in close engagement with the wall of the hole; if the engagement is wholly or principally with the part of the hole wall nearest to the flexible member, as the conical shape of the bush necessarily in practice results in the diameter of the hole end nearest the flexible member being appareciably greater than, e.g. twice the diameter of the cylindrical hole, the area of contact between the hole wall at this position and the bush is correspondingly increased with resultant corresponding decrease in the local pressure of the bush on the drive member hole. Indeed with this invention as a result of this considerable reduction in bearing pressure, it is believed one can make the parts in mild steel as opposed to a high tensile steel or possibly an aluminium or bronze alloy in situations where corrosion or spark risks are a problem and the torques are low.

5. Because of the coned shape of the bush it is believed that as this is forced into position during the tightening of the bolt, the frusto-conical portion is contracted into tight gripping engagement with the exterior of the bolt which is desirable and which effect cannot obtain with bushes of cylindrical form.

From the foregoing the importance of the present invention will be readily understood.

In the preferred form of the invention in which the overall axial length of each drive member bolt receiving hole is substantially greater than, i.e. at least twice the length of the part of the hole which receives the bush, the mouth of the hole at the face of the drive member furthest from the flexible member may be countersunk, i.e. is of inwardly tapered form to engage with a correspondingly, tapered underside to the bolt head. Thus when the bolt is tightened the shank thereof is necessarily central in relation to the hole, the non-conical part of which may therefore have an over-size bore in relation to the bolt shank diameter, whereby the assembly of the bolts in relation to the other parts of the coupling is greatly facilitated, with consequent further saving in assembly cost.

In carrying the invention into effect, in order to reduce the number of parts to a minimum, the required axial spacing of the flexible members from the adjacent part of each drive member to which it is bolted is preferably obtained by each bush having an integral spacer portion extending axially away from the associated drive member into engagement with the adjacent face of the flexible member with the threaded bolt carrying a tightening nut arranged to apply clamping pressure to the opposite face of the flexible member to connect the latter to the associated drive members. The peripheral corner of such spacer portion and which is nearest to the flexible member would be formed in the known manner to convexedly curved form. This permits of the flexible member adjacent to the periphery of the spacer portion readily flexing without risk of it cracking at such position.

BRIEF DESCRIPTION OF THE DRAWINGS.

The invention is illustrated in the accompanying drawings wherein.

Figure 1:
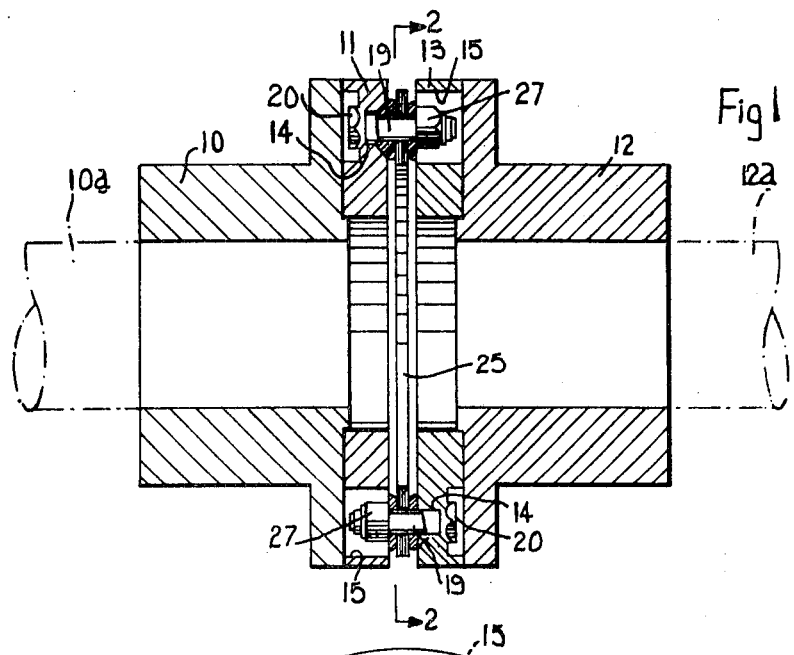
FIG. 1 is a sectional side elevation of one form of torque transmitting coupling of the kind specified in accordance with this invention.
Figure 2:
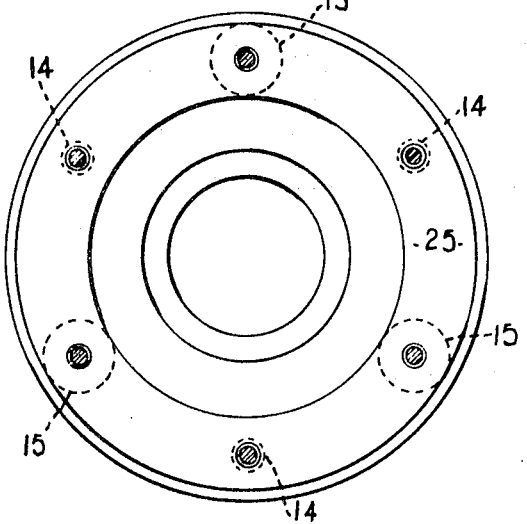
FIG. 2 is a sectional view on the line 2-2 of FIG. 1.

DESCRIPTION OF THE PREFERRED EMBODIMENT.

Referring to the drawings, the flexible torque transmitting coupling there illustrated comprises a hub 10 on which is mounted a first drive member 11 in the form of a flange and a hub 12 coaxial with the hub 10 on which is mounted a second drive member 13 also in the form of a flange, coaxial with but axially spaced from flange-like member 11.

The two flange-like drive members 11, 13 may be integral with the hubs 10, 12 or they may as shown be separate from and secured to their respective hubs 10, 12, by screws or other means not illustrated. The hubs 10, 12 would be adapted for mounting on corresponding shafts 10a, 12a.

Each drive member 11, 13 includes three through holes 14 which are equi-angularly spaced and three through apertures 15 of bore larger than that of the holes 14 and again equiangularly spaced with a spacing of 60° between the central axis of a hole 14 and the central axis of an adjacent aperture 15.

Figure 3:
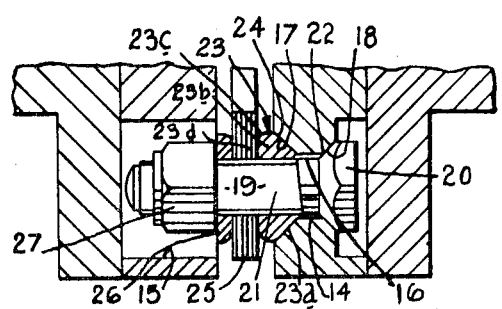
FIG. 3 is a sectional view to a larger scale of part of the same coupling.

As best shown in FIG. 3, each hole 14 includes a central cylindrical portion 16 and a pair of end portions 17 and 18. The end portions 17 each provide a frusto-conical seating respectively facing towards and away from the axially adjacent drive member. A high tensile steel bolt 19 having a head 20 and a cylindrical shank 21 screw threaded at its outer end is fitted in each of said holes 14, with circumferentially adjacent bolts extending in opposite axial directions from their respective heads. The head 20 of each bolt 19 has a frusto-conical under surface 22 which seats against the frusto-conical seating 18 Each bolt shank 21 extends through a metal bush 23 including a frusto-conical portion 23a having a cone angle the same as that of the seating 17 within which the bush extends, with its frusto-conical peripheral surface 24 engaging against the complementary frusto-conical seating 17.

Disposed between the two flange like drive members 11, 13, so as to be spaced axially therefrom, is an annular shaped flexible torque transmitting member 25 formed of a number of flexible metal annular strips which are disposed in overlying relation to one another with their major axis of cross section extending radially to the axis of rotation of members 11 and 13. The member 25 is thus of laminated construction so that its flexibility in a direction normal to the major axis of cross section of the flat strip is thereby increased as compared with an otherwise identical member of solid form.

Each bush 23 at the end thereof opposite to the frusto-conical portion 23a is formed with an integral spacer portion 23b which when the parts are assembled extends axially away from the associated drive member to which it is bolted into engagement with the adjacent face of the flexible member 25. Thus the latter is maintained by the bushes in axially spaced relation from the drive members 11, 13 by a distance sufficient to permit of the member 25 at positions between circumferentially adjacent bolts 19 flexing in a substantially axially direction without fouling the adjacent drive members.

As shown the spacer portion 23b is of cylindrical form peripherally adjacent the larger diameter end of the frusto-conical portion 23a. Thus as is preferred, spacer portion 23b has a diameter not greater than the maximum diameter of coned portion 23a. The outer periphery 23c of portion 23b at the end of the latter which is furthest from the coned portion 23a, i.e. adjacent member 25 is in the known manner of convexedly curved form so as to provide maximum freedom of the member 25 to flex consistent with the spacer portion 23b engaging on its end face 23d with member 25 when the parts are assembled.

The shank 21 of each bolt 19 is passed through an appropriate aperture in the member 25 with the bush 23 on one side of the member 25 and a washer 26 on the other side. A nut 27 is then tightened onto the threaded free end portion of the shank 21 of the bolt 19; access to the nut 27 being obtained through the aligned aperture 15 in the adjacent drive member.

In the above described assembly operation, the bushes 23 would first be positioned loosely within as opposed to being fitted within, the drive member holes 14, and the coned periphery of their coned portions 23a would be brought into close engagement with the seating provided by the wall of the coned end portion 17 of each hole as the nuts 27 are tightened.

By reason of the frusto-conical under surface 22 of each bolt head which engages with the coned end portion 18 of each hole 14, the bolts 19 are self centring in their respective holes 14. Thus as shown in FIG. 3 clearance which is more than working clearance, e.g. at least about one mm clearance is provided between the cylindrical portion 16 of each hole and the bolt shank 21 by making the latter of smaller diameter than that of portion 16 to the extent above indicated. Thus positioning of the bolts within the holes 14 and the assembly of the coupling is facilitated.

Thus in the assembled coupling, the flexible annular member 25 is bolted at three positions to each of the two drive members 11, 13, the three positions at which the member 25 is bolted to the member 11, alternating with the three position at which it is bolted to drive member 13. The two drive members 11 and 13 and their respective hubs 10, 12 can thus effect limited relative angular and axial movements, the laminated member flexing to permit of this.

The above described form of coupling possesses all of the advantages earlier specified. Also in the particular arrangement shown, the flange-like drive members 11 and 13, by being of annular form, are such that there are no projecting parts of the coupling which is a requirement for some form of industrial machinery. Thus if desired, a guard can be secured to either of the two members 11 and 13, the guard including a sleeve portion which fits over the space between the two members so that, in the unlikely event of fracture of one or other of the bolts 19, the guard will serve to contain the broken parts of the bolt and prevent injury to the operators or damage to adjacent equipment.

I claim:

1. A torque transmitting flexible coupling of the kind comprising a pair of rotatable metal drive members in spaced apart coaxial relationship, with a flexible torque transmitting member disposed therebetween and drivingly connected to each of the drive members by screw threaded bolts each extending through the flexible member and one or the other of the two drive members, the latter being provided with bolt receiving metal bushes through which the bolts extend in a direction parallel to the axis of rotation of the associated drive member, the arrangement being such that as a result of any misalignment of the axes of rotation of the two drive members the flexible member at positions between the axially extending bolts is free to flex in a direction towards either drive member, characterized in that each of the bush receiving holes in the two drive members is of frusto-conical as opposed to cylindrical form, so as to be of progressively reduced diameter in an axial direction inwardly from the face of the drive member nearest to the flexible member, and each of the bushes comprises a frusto-conical portion which extends within the corresponding hole in which it is secured by the associated bolt when the latter is tightened, the cone angle of each frusto-conical portion being not less than the cone angle of the corresponding hole and such that when the bolt is tightened, at least the larger diameter portion of the hole, nearest to the flexible member, is in close engagement with the frusto-conical periphery of the bush therewithin.

2. A coupling according to claim 1, characterized in that the overall axial length of each drive member bolt receiving hole is substantially greater than the length of the part of the hole which receives the bush, and that the mouth of the hole at the face of the drive member furthest from the flexible member is of inwardly tapered form to engage with a correspondingly tapered underside to the bolt head, so that when the bolt is tightened the shank thereof is necessarily central in relation to the hole, the non-conical part of which has an over-sized bore in relation to the bolt shank diameter.

3. A coupling according to claim 1 characterized in that each bush has an integral spacer portion extending axially away from the associated drive member into engagement with the adjacent face of the flexible member, which spacer portion has a peripheral diameter not greater than the maximum diameter of the bolt receiving hole, with the threaded bolt carrying a tightening nut arranged to apply clamping pressure to the opposite face of the flexible member to connect the latter to the associated drive members.

4. A coupling according to claim 1, characterized in that the flexible member is of annular form, with the bolts spaced circumferentially around the annular member, with circumferentially adjacent bolts extending in opposite axial directions from the annular member to one or the other of the two drive members.

5. A coupling according to claim 4 characterized in that the annular flexible member is of laminated construction, formed of a number of juxtaposed overlying annular flexible metal strips disposed with the major axes of cross section lying in planes substantially radial to the axis of rotation of the coupling.

* * * * *